United States Patent [19]

McBride

[11] 4,278,637
[45] Jul. 14, 1981

[54] CHEMICAL OXYGEN GENERATOR

[75] Inventor: William S. McBride, Huntsville, Ala.

[73] Assignee: Drägerwerk Aktiengesellschaft, Fed. Rep. of Germany

[21] Appl. No.: 141,129

[22] Filed: Apr. 17, 1980

[30] Foreign Application Priority Data

May 8, 1979 [DE] Fed. Rep. of Germany ....... 2918417

[51] Int. Cl.³ .......................... F01C 19/02; F03C 2/00; F01C 1/00
[52] U.S. Cl. .................................. 422/122; 422/126; 422/165; 128/202.26
[58] Field of Search ............... 422/120, 122, 123, 125, 422/126, 165, 166; 102/39; 128/202.26

[56] References Cited

U.S. PATENT DOCUMENTS

| 3,806,323 | 4/1974 | Thompson | 422/122 |
| 4,069,021 | 1/1978 | Schneider | 422/125 |

Primary Examiner—William F. Smith
Assistant Examiner—Chris Konkol
Attorney, Agent, or Firm—McGlew and Tuttle

[57] ABSTRACT

A chemical oxygen generator which is operable by movement of a starter member or thrust member comprises an outer closed container having an end wall on the interior of which an ignition actuation liquid container is mounted. The ignition actuation liquid container is made of a foil material and it is mounted over an ignition mixture container having an ignition mixture which when mixed with the liquid ignites so as to ignite a spark plug for the oxygen generator material.

5 Claims, 1 Drawing Figure

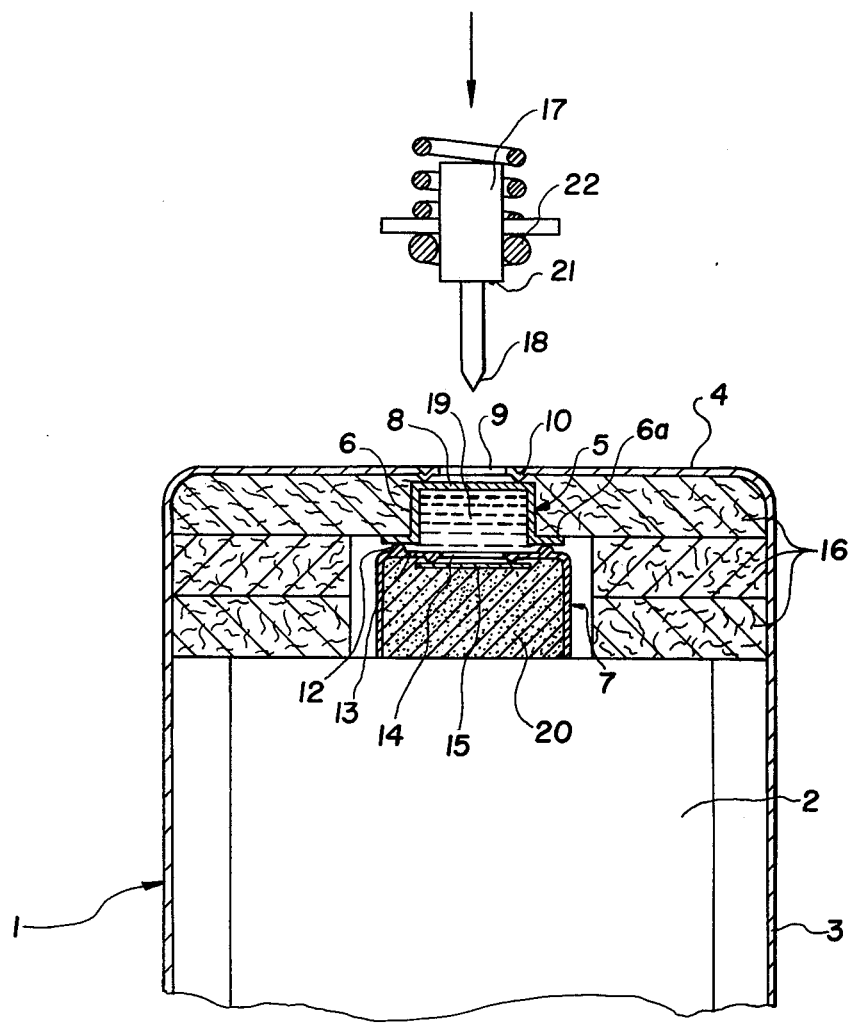

CHEMICAL OXYGEN GENERATOR

FIELD AND BACKGROUND OF THE INVENTION

The invention relates in general to chemical oxygen generators and in particular to a new and useful oxygen generator with an oxygen spark plug disposed in a container and arranged in series for activation with a starter and with a closed element containing a liquid, which can be destroyed from the outside, and with an ignition mixture activated by the liquid.

Chemical oxygen generators contain oxygen in combined form. Known are respirators which use chlorate spark plugs, generally called oxygen spark plugs, and respirators which use $KO_2$ cartridges.

After the start by means of a starter, the oxygen spark plug supplies oxygen continuously. The $KO_2$ cartridge requires carbon dioxide and moisture from the exhaling air for the reaction by which the oxygen is released.

Since this reaction can naturally only start after a few breaths, an oxygen spark plug takes over the oxygen supply in an apparatus with a $KO_2$ cartridge, until the $KO_2$ cartridge is activated.

A known chemical oxygen generator has in a container an ignition mixture activated by water, etc. and an oxygen spark plug activated by the ignition mixture. Above the ignition mixture under the cover of the container is arranged a water-filled glass ampoule in the cavity of a pot-shaped dish. The dish has a deformable convex bottom in the manner of a spring diaphragm. The cover of the container is provided with a center with an opening which is tightly sealed with a foil. For starting the oxygen generator by activating the oxygen plug, a thrust bolt is pressed down, which is arranged on the cover of the container and which is operated from the outside. It penetrates the foil and then presses on the convex bottom of the dish. The dish jumps out of its normal position into a concave position and destroys the glass ampoule. The issuing water activates the ignition mixture and thus starts the oxygen generator. A disadvantage of this starter is the sensitive glass ampoule. It must be arranged shock-proof in the container between the oxygen spark plug and the thrust bolt and must be kept in close contact with the ignition mixture. This requires a special arrangement in an additional part, which is not simple, due to the design of its bottom as a spring diaphragm. (DOS No. 26 20 300).

SUMMARY OF THE INVENTION

The invention provides a chemical oxygen generator with a starter which operates in response to the reaction of an activating liquid with an ignition mixture, and which includes a liquid container which is simple in design and which works reliably and is arranged shock-proof mounting.

In accordance with the invention there is provided a chemical oxygen generator which includes an outer housing which has a top wall which is welded on its interior to a liquid capsule. The liquid capsule is made of a foil material and it contains a liquid which acts as an igniter or reactor for an ignition material. The ignition material is contained in a container mounted directly below the foil container and sealed with the foil container by the welding of the flanges of the foil container directly to the container for the ignition material. The container for the ignition material also contains an opening directly under the liquid in the capsule and it contains a removable foil member sealing this opening which can be removed by depressing the capsule downwardly into the ignition material container. This causes the reaction liquid to mix with the ignition mixture material and produce ignition thereof and the subsequent ignition of a spark plug which is mounted directly below the ignition material.

The advantages of the solution result clearly from the use of the liquid capsule of foil material. It is thus shock-proof, which ensures that the liquid will not escape, even after shock stresses, so that the ignition mixture can not be accidentally activated. The manufacture of the simple starter is moreover economical and reliable.

In accordance with the invention there is provided a chemical oxygen generator which is operable by movement of a starter member which comprises an outer closed container having an end wall, an ignition actuation liquid container made of foil material mounted in said container adjacent the end wall, and an ignition mixture container mounted in said container adjacent the actuation liquid container and having an end wall facing the actuation liquid container with an opening covered by a rupturable foil which when removed permits the actuation liquid to enter into the ignition mixture of the ignition mixture container.

A further object of the invention is to provide a chemical oxygen generator which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWING

The only FIGURE of the drawing is an exploded transverse sectional view of a chemical oxygen generator and actuator therefor constructed in accordance with the invention.

DETAILED DESCRIPTION OF THE PREFERRED EMBODIMENT

Referring to the drawings in particular the invention embodied therein comprises a chemical oxygen generator generally designated 1 which includes an exterior container wall 3 having an end or top portion such as a cover 4. In accordance with the invention a liquid capsule 6 is secured by a welded seam 10 to the cover 4 directly below an opening 9 thereof. The bottom edge of the liquid capsule 6 contains an annular flange 6a which is closed by a top wall 13 of an ignition material container generally designated 7. The capsule is sealed at its flange 6a to the top wall 13 by an annular weld 12. The top wall 13 contains an opening 14 which is closed by a foil material 15 which when removed will permit actuation liquid 19 in the capsule 6 to flow into ignition material or a mixture 20 contained in the ignition material container 7.

Oxygen generator 1 comprises an oxygen spark plug 2 in a container 3. Between cover 4 and oxygen spark plug 2 is arranged a starter 5. The starter 5 comprises a liquid capsule 6, made of a metal foil material and mounted above an ignition mixture container 7 made of any plate material. Ignition mixture container 7 provides the necessary support for the oxygen spark plug 2. Liquid capsule 6 is arranged with its end wall or bottom 8 underneath hole 9 in cover 4. Liquid capsule 6 is held there by a welded seam 10. The interior of the container 3 is sealed gas-tight to the outside. Liquid capsule 6 is joined, liquid- and gas-tight with its turned-over edge 11 by a welded seam 12 with an end wall 13 of the ignition mixture container 7. A connecting opening 14 formed in end wall 13 as a connection between liquid capsule 6 and ignition mixture container 7 is sealed liquid-tight by means of foil 15. Filter mats 16 fill the empty space between cover 4 and oxygen spark plug 2. They serve as shock absorbers and insulators.

A starter member in the form of thrust bolt 17 is arranged in a known manner (not shown) above the cover 4. After release by pressure from the top, point 18 pierces the bottom 8 of liquid capsule 6 and foil 15, thus opening the way for an actuator liquid 19 to control an ignition mixture 20 in the container 7. On the further path of the thrust bolt 17 the bolt end 21 pushes liquid capsule 6 in front of it, after welded seam 10 has broken off, and pushes liquid 19 fully into ignition mixture 20. With the end of the downward movement of thrust bolt 17 gasket 22 seals a hole 9 in the cover 4 from the outside.

The oxygen released after the activation of spark plug oxygen 2 issues through a specially provided opening (not shown) in container 3 and is fed to a respirator for supplying oxygen to breathing air. Hole 9 can also be used for this purpose in a special design.

While a specific embodiment of the invention has been shown and described in detail to illustrate the application of the principles of the invention, it will be understood that the invention may be embodied otherwise without departing from such principles.

What is claimed is:

1. An improved chemical oxygen generator of the type having an outer container, an ignition mixture activatable by a liquid, means for enclosing the liquid, and starter means accessible from outside of the outer container for rupturing the enclosing means to release the liquid to ignite the ignition mixture, the improvement comprising an ignition mixture container in the outer container containing the ignition mixture, said ignition mixture container having an opening and a first foil sealingly overlying the opening, the outer container having an opening extending therethrough for passing the starter means, and wherein the enclosing means comprises a second foil fixedly connected to the inner wall surface of the outer container and sealingly overlying the opening of the outer container, and wherein said second foil is fixedly connected to said ignition mixture container and the liquid is contained intermediate said second foil and said first foil of the ignition mixture container.

2. The improved chemical oxygen generator as set forth in claim 1, wherein said first and second foils are metal foils.

3. The improved chemical oxygen generator as set forth in claim 2, wherein said second foil is weldably connected to said outer container and the starter means is operable to rupture said second foil.

4. The improved chemical oxygen generator as set forth in claim 3, wherein the starter means includes a thrust bolt member engageable through said opening of the outer container to sever said first and said second foils.

5. The improvied chemical oxygen generator as set forth in claim 4, wherein the liquid is water.

* * * * *